March 3, 1931. J. CROOKSHANKS ET AL 1,795,164

CIRCUIT CLOSER

Filed Jan. 22, 1927

Inventors
John Crookshanks
and
James Fraser Crichton
By B. Singer, Atty.

Patented Mar. 3, 1931

1,795,164

UNITED STATES PATENT OFFICE

JOHN CROOKSHANKS, OF GLASGOW, AND JAMES FRAZER CRICHTON, OF COATBRIDGE, SCOTLAND

CIRCUIT CLOSER

Application filed January 22, 1927, Serial No. 162,760, and in Great Britain February 4, 1926.

Our invention relates to improvements in and connected with means for signalling the intentions of the driver of a motor vehicle, particularly in the dark, and has for its object to provide such of a most simple, cheap and efficient nature, and one that can be fitted with ease in a very short space of time and which does not in any way detract from the appearance of the car.

At present a hand is pushed out of the side of the vehicle to indicate the driver's intentions, but this is very unsatisfactory as in the case of dark or foggy weather, it is not really seen, and therefore accidents occur which would otherwise be averted by the use of this invention.

In carrying out this invention, we provide one or two small illuminating electric lamps suitably attached to any convenient part of the vehicle on one or each side thereof so that there will be an illuminating beam upon the driver's hand when extended to indicate his intention. The ray or electric lamp or lamps which may be coloured or otherwise is or are suitably connected with a switch operating arm or other suitable switch device along the top edge of the car, or on any other convenient part. When two lamps are used, one is placed in front and the other behind the position occupied by the driver's hand in making an ordinary traffic signal. The radius of light supplied by the lamps is sufficiently wide to include all necessary movements of the arm and the illumination afforded renders the nature of the signal unmistakable to other road users.

We may also so arrange the electric horn that it can be sounded if, and when, desired, simultaneously with the visible signal.

The rear lamp or lamps may be duplicated with a similar lamp on other side of car and by arrangement can be illuminated alone to act as parking lamps on the car.

In order that our invention may be properly understood and readily carried into effect, we have hereunto appended one sheet of drawings, of which:—

Figure 1:
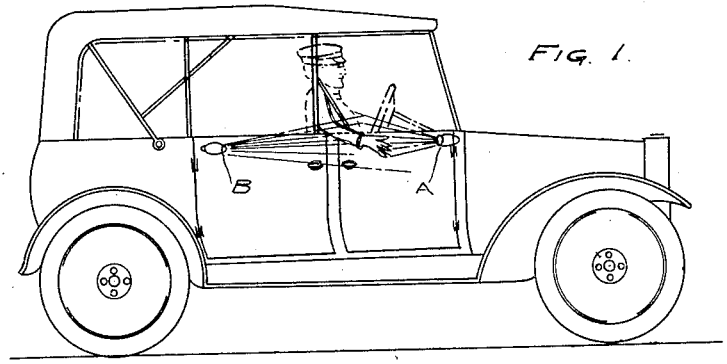
Figure 1 is a side elevation of a car illustrating our invention.
Figure 2:
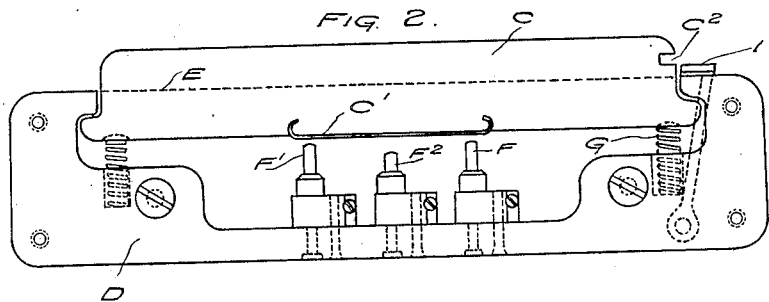
Figure 2 is an elevation of the switch with front plate removed.
Figure 3:
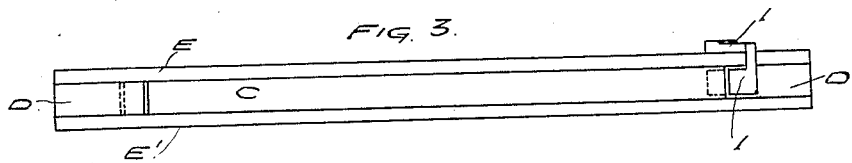
Figure 3 is a plan of Figure 2.
Figure 4:
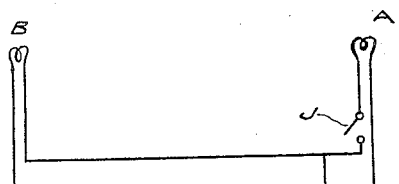
Figure 4 is a diagrammatic view of the wiring.

Referring to the drawings, A and B are the electric lamps and A'' is the flap through which the chauffeur or driver—when a flap is on the car—pushes out a hand K and in so doing his arm rests on the arm or other switch, to be hereinafter described, and automatically switches on the current and lights up the lamps A and B, thus directing the illuminating ray-lamp on the hand of the chauffeur or driver. Immediately he pulls in his hand the electric connection is automatically cut off and the lamp goes out.

The switch consists of an operating arm C, having contact pieces C' and body D enclosed between two side plates E, E'. The spring contact-points or terminals F, F' are attached to the body D and are in electrical connection with the front and rear lamps A and B and another contact point or terminal $F^2$ is or are electrically connected with the horn H, spiral or other springs G, G' being provided for returning the operating arm C to its normal position.

A contacting catch I pivoted at one end to the body D is provided with the view of engaging a notch $C^2$ in the arm C in order to hold the arm C down on the contact-pieces or terminals F, F' when for parking purpose only.

J is switch for cutting off front lamp K in the horn switch.

In wiring up, three terminals or contact points are only described and shown but it is to be understood that four may be used if desired.

Any suitable system of wiring may also be used when four terminals are employed, the contact bar or bars being made to suit such.

Claims:

1. A switch comprising a body, an operating bar forming an arm rest mounted in said body for movement at substantially right angles to the axis of said bar, said bar having stop shoulders projecting from its ends, and said body having stop shoulders overhanging those of the bar, supporting springs for the bar arranged at opposite ends thereof, a plurality of spaced contact pieces in the body below the bar and arranged in line longitudinally of the body and a contact piece on the underside of the bar and arranged longitudinally thereof to close a circuit between two of said contacts when said bar is depressed from either end to a slight extent and also between a third contact when said bar is depressed throughout its length to a greater extent.

2. A switch as claimed in claim 1 including also a catch pivotally connected to one end of the body and in which the bar is provided at the corresponding end with a notch to receive said catch and thereby lock said bar when the notched end thereof is in depressed position.

In witness whereof we affix our signatures.

JOHN CROOKSHANKS.
JAMES FRAZER CRICHTON.